United States Patent
Takahashi et al.

[11] 3,896,127
[45] July 22, 1975

[54] THEOPHYLLINE DERIVATIVES

[75] Inventors: Hidehiko Takahashi, Tokyo; Yoshio Suzuki, Misato-Machi; Tuyoshi Kinoshita, Koshigaya, all of Japan

[73] Assignee: Nippon Chemiphar Co., Ltd., Tokyo, Japan

[22] Filed: July 13, 1973

[21] Appl. No.: 378,806

[30] Foreign Application Priority Data
July 13, 1972  Japan.............................. 47-70294

[52] U.S. Cl................................ 260/256; 424/253
[51] Int. Cl............................................ C07d 57/48
[58] Field of Search ................................... 260/256

[56] References Cited
UNITED STATES PATENTS

| | | | |
|---|---|---|---|
| 3,399,195 | 8/1968 | Stachel et al. | 260/256 |
| 3,813,394 | 5/1974 | Tensho et al. | 260/252 |

Primary Examiner—Donald G. Daus
Assistant Examiner—Anne Marie T. Tighe
Attorney, Agent, or Firm—Oblon, Fisher, Spivak, McClelland & Maier

[57] ABSTRACT

Theophylline compounds of the formula,

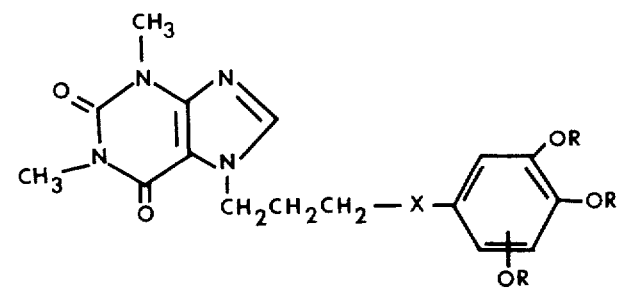

wherein X is oxycarbonyl, carboxyl or carbonyl and R is a lower alkyl group containing from 1 to 5 carbon atoms which have excellent coronary vasodilating effects are produced by reacting a compound having the formula

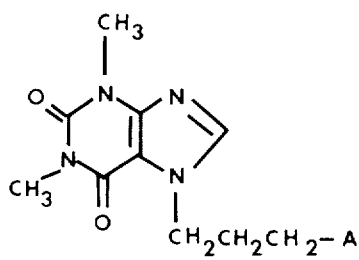

wherein A is hydroxyl, or a carboxyl containing group or a halogenide, acid anhydride or ester thereof, with a compound having the formula

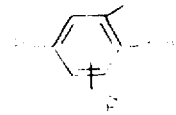

wherein B is hydrogen, hydroxyl, or a carboxyl containing group or a halogenide, acid anhydride or ester thereof, and R is defined as before.

5 Claims, No Drawings

THEOPHYLLINE DERIVATIVES

BACKGROUND OF THE INVENTION

1. Field of the Invention

This invention relates to theophylline derivatives and a process for producing said derivatives. More particularly, this invention is concerned with theophylline derivatives having the formula (I):

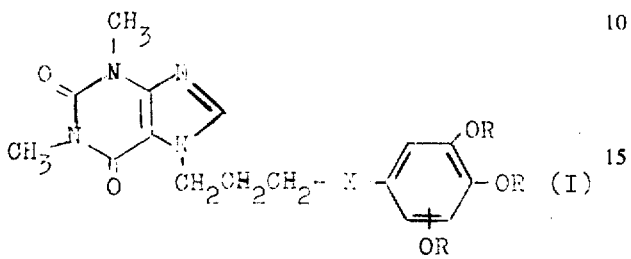

wherein R is lower alkyl containing from 1 to 5 carbon atoms, and X is an oxycarbonyl, carboxyl or carbonyl group, and a process for preparing same.

2. Description of the Prior Art

Theophylline is known to possess coronary vasodilating effects and is, therefore, effective in the treatment of angina pectoris. However, it also stimulates the heart rate and enhances myocardial oxygen consumption, which results in an insufficient supply of oxygen to the heart.

A need, therefore, exists for a therapeutic agent which possesses satisfactory coronary vasodilating effects while at the same time not acting as a heart stimulant to diminish the vital supply of oxygen to heart tissues.

SUMMARY OF THE INVENTION

Accordingly, one object of this invention is to provide theophylline derivatives having the formula (I) which possess superior coronary vasodilating effects.

Another object of this invention is to provide an industrially advantageous process for the synthesis of theophylline derivatives represented by formula (I).

Briefly, these objects and other objects of this invention as hereinafter will become more readily apparent can be attained by a process for preparing theophylline compounds having the formula

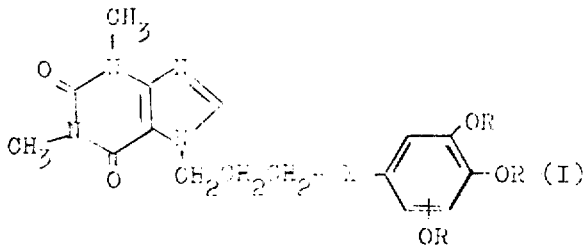

wherein X is an oxycarbonyl, carboxyl or carbonyl group and R is a lower alkyl containing 1-5 carbon atoms, which comprises reacting a compound of the formula,

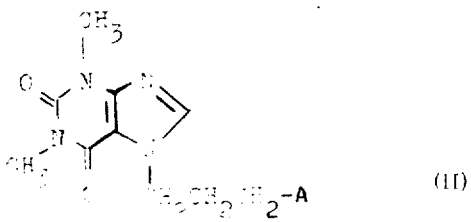

wherein A is hydroxyl, or a carboxyl containing group or a halogenide, acid anhydride or ester thereof, with a compound of the formula,

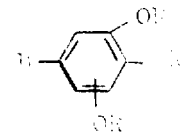

wherein B is hydrogen, hydroxyl, or a carbonyl containing groups, or a halogenide, acid anhydride or ester thereof and R is defined as before.

DESCRIPTION OF THE PREFERRED EMBODIMENTS

In conducting the process of this invention, compound (II) is reacted with trialkoxy arene compound (III) in an inert solvent under reflux conditions. It has also been found that the reaction can be performed in the presence of a condensing agent such as a trialkyl amine. Although the time required for the reaction to go to completion will vary according to the reactivity of the compounds (II) and (III) and the reaction temperature, normally from 2 to 10 hours will be sufficient.

Compounds II and III which are the starting materials for the reaction of the invention contain reactive functional groups A and B respectively. Suitable functional groups for the group A include hydroxyl, or carboxyl containing groups of halogenides, acid anhydrides or esters thereof. Suitable functional groups for the group B include hydrogen, hydroxyl, carboxyl containing groups or halogenides, acid anhydrides or esters thereof. Suitable R groups in compound III include methyl, ethyl, propyl, isopropyl and the like.

In order to determine the physiological effects of the theophylline derivatives on coronary circulation, the effects of the compounds were compared to the effects exhibited by theophylline and nitroglycerin in thoractomized dogs. As shown in Table I, the coronary sinus out flow after the administration of the theophylline compounds was found to be as high as that of theophylline, indicating that the compounds of this invention exhibit as strong a coronary vasodilating effect as the comparative compounds. As can be seen from Tables II and III, administration of theophylline derivatives, particularly TG–3, resulted in relatively low myocardial oxygen comsumption with a reduced heart rate, in contrast to the effect exhibited by theophylline. The data obtained indicates that the theophylline compounds of this invention exhibit excellent coronary vasodilating effects while at the same time exhibiting lesser adverse effects on the myocardium in comparison to theophylline.

Table I

| Compounds | Dose (mg/kg) | No. of animals | Initial basal values | Coronary Sinus Out Flow in Dogs (ml/min) Changes(%) of basal values | | | | | | | |
|---|---|---|---|---|---|---|---|---|---|---|---|
| | | | | 0 | 1 | 5 | 10 | 15 | 20 | 25 | 30 (min) |
| TG-1 | 2.0 | 3 | 42.0 | +6.5 | +7.0 | +10.0 | +10.5 | +8.0 | +6.0 | +2.0 | 0 |
| | 6.0 | 3 | 44.0 | +32.0 | +24.0 | +18.0 | +18.0 | +18.5 | +20.5 | +20.0 | +16.0 |
| | 20.0 | 3 | 42.5 | +77.5 | +88.5 | +45.0 | +39.5 | +31.0 | +22.0 | +16.5 | +15.0 |

Table I — Continued

| | | | Coronary Sinus Out Flow in Dogs (ml/min) | | | | | | | |
|---|---|---|---|---|---|---|---|---|---|---|
| | | | | Changes(%) of basal values | | | | | | |
| Compounds | Dose (mg/kg) | No. of animals | Initial basal values | 0 | 1 | 5 | 10 | 15 | 20 | 25 | 30 (min) |
| TG-2 | 2.0 | 3 | 57.0 | +10.0 | +12.0 | −3.0 | −1.0 | 0 | 0 | 0 | 0 |
| | 6.0 | 3 | 56.0 | +55.5 | +38.0 | +15.0 | +2.0 | 0 | −1.0 | −1.0 | −2.0 |
| | 20.0 | 3 | 51.0 | +144.0 | +116.0 | +26.5 | +6.5 | 0 | −2.5 | −5.0 | −4.5 |
| TG-3 | 2.0 | 4 | 38.8 | +6.5 | +16.9 | +4.1 | +2.4 | +1.9 | +1.4 | +0.6 | +0.1 |
| | 6.0 | 4 | 41.6 | +50.2 | +71.4 | +17.7 | +10.1 | +7.1 | +2.1 | +2.0 | +1.5 |
| | 20.0 | 4 | 37.6 | +100.0 | +145.6 | +96.4 | +70.9 | +18.0 | +17.0 | +17.0 | +12.0 |
| Theophylline | 0.2 | 4 | 28.8 | +1.0 | +1.5 | +1.5 | 0 | 0 | 0 | 0 | 0 |
| | 0.6 | 4 | 33.0 | +16.5 | +7.5 | +5.5 | +4.0 | 0 | 0 | 0 | 0 |
| | 2.0 | 4 | 34.0 | +21.0 | +18.0 | +12.0 | +7.0 | +7.0 | +7.0 | +7.0 | +6.0 |
| Nitroglycerin | 0.002 | 5 | 60.0 | +7.5 | −4.0 | 0 | +2.0 | +1.0 | +1.0 | +0.5 | 0 |
| | 0.006 | 5 | 52.0 | +10.5 | −9.0 | −5.5 | −6.0 | 0 | +3.0 | +4.5 | +3.0 |
| | 0.02 | 5 | 32.0 | +34.5 | −6.5 | −4.5 | −2.0 | −0.5 | +4.5 | +3.0 | +3.5 |

NOTE:
TG-1: 7-[γ-(3,4,5-trimethoxybenzoyloxy)-n-propyl]theophylline
TG-2: 7-[γ-(3,4,5-trimethoxyphenoxycarbonyl)-n-propyl]theophylline
TG-3: 7-[γ-(2,3,4-trimethoxybenzoyl)-n-propyl]theophylline Table II

| | | | Coronary Sinus Oxygen Tension in Dogs (mmHg) | | | | | | | |
|---|---|---|---|---|---|---|---|---|---|---|
| | | | | Changes of basal values | | | | | | |
| Compounds | Dose (mg/kg) | No. of Animals | Initial basal values | 0 | 1 | 5 | 10 | 15 | 20 | 25 | 30 (min) |
| TG-1 | 2.0 | 3 | 20.0 | +7.5 | +1.0 | 0 | +1.5 | 0 | 0 | 0 | 0 |
| | 6.0 | 3 | 16.0 | +10.5 | +13.0 | +4.5 | +5.0 | +3.0 | +3.0 | +2.5 | +2.5 |
| | 20.0 | 3 | 18.0 | +55.7 | +34.0 | +16.0 | +15.5 | +13.5 | +5.5 | +4.0 | +4.0 |
| TG-2 | 2.0 | 3 | 23.5 | +5.5 | +4.0 | −1.0 | 0 | 0 | 0 | 0 | 0 |
| | 6.0 | 3 | 23.0 | +26.0 | +16.5 | 0 | −2.0 | −2.0 | −2.5 | −2.0 | −2.0 |
| | 20.0 | 3 | 21.5 | +63.5 | +51.0 | +7.5 | +2.0 | −3.5 | −4.5 | −5.0 | −4.0 |
| TG-3 | 2.0 | 4 | 18.2 | +9.5 | +47.0 | +7.5 | +0.9 | +0.9 | 0 | 0 | 0 |
| | 6.0 | 4 | 18.9 | +94.0 | +144.8 | +41.5 | +16.3 | +11.5 | +5.0 | +2.5 | +1.0 |
| | 20.0 | 4 | 20.0 | +161.0 | +179.2 | +85.2 | +34.1 | +27.7 | +20.2 | +22.3 | +19.0 |
| Theophylline | 0.2 | 4 | 18.5 | 0 | −3.0 | −3.0 | −3.0 | −2.0 | −1.0 | 0 | 0 |
| | 0.6 | 4 | 15.0 | +4.5 | +4.5 | −13.5 | −8.0 | −5.5 | −5.0 | −5.0 | −6.0 |
| | 2.0 | 4 | 17.0 | +2.5 | +9.5 | −1.0 | −4.0 | −6.0 | −8.0 | −8.0 | −9.0 |
| Nitroglycerin | 0.002 | 5 | 25.0 | +12.0 | −5.5 | +1.0 | +1.0 | +2.0 | +2.0 | +0.5 | 0 |
| | 0.006 | 5 | 29.5 | +16.0 | +5.5 | −4.5 | −1.0 | +1.5 | +4.0 | +3.0 | +2.0 |
| | 0.02 | 5 | 23.0 | +25.0 | +8.0 | −5.0 | −2.5 | +2.5 | +4.0 | +4.0 | +5.0 |

NOTE: TG-1, TG-2 and TG-3 are the same in Table I

Table III

| | | | Heart rate in Dogs (beats/min) | | | | | | | |
|---|---|---|---|---|---|---|---|---|---|---|
| | | | | Changes(%) of basal values | | | | | | |
| Compounds | Dose (mg/kg) | No. of animals | Initial basal values | 0. | 1 | 5 | 10 | 15 | 20 | 25 | 30 (min) |
| TG-1 | 2.0 | 3 | 175 | +2.5 | +1.0 | +2.5 | +2.5 | +2.0 | +1.0 | 0 | 0 |
| | 6.0 | 3 | 182 | +5.0 | +3.5 | +4.0 | +4.0 | +3.0 | +3.0 | +3.0 | +3.0 |
| | 20.0 | 3 | 197 | +11.5 | +11.5 | +13.5 | +13.0 | +11.5 | +10.0 | +11.5 | +10.0 |
| TG-2 | 2.0 | 3 | 176 | +4.0 | +3.0 | +2.5 | +2.5 | +2.0 | +1.0 | +1.0 | +1.0 |
| | 6.0 | 3 | 184 | +6.0 | +4.5 | +4.5 | +5.5 | +5.2 | +2.0 | +2.0 | +2.0 |
| | 20.0 | 3 | 187 | +7.0 | +7.0 | +10.0 | +8.5 | +9.5 | +9.0 | +7.0 | +7.0 |
| TG-3 | 2.0 | 4 | 184 | −0.3 | 0 | +0.3 | +0.9 | +0.9 | +0.3 | +0.2 | 0 |
| | 6.0 | 4 | 185 | −4.5 | +0.5 | +2.6 | +1.9 | +1.1 | −1.1 | −3.0 | −2.7 |
| | 20.0 | 4 | 181 | −12.1 | +8.0 | +3.9 | −5.2 | −11.1 | −13.4 | −11.0 | −11.0 |
| Theophylline | 0.2 | 4 | 203 | +2.0 | +3.0 | +0.5 | +0.5 | +0.5 | +0.1 | +0.5 | 0 |
| | 0.6 | 4 | 202 | +4.0 | +5.0 | +4.0 | +1.5 | +2.0 | +2.0 | +1.0 | 0 |
| | 2.0 | 4 | 200 | +10.0 | +11.5 | +9.0 | +7.0 | +4.5 | +5.5 | +4.5 | +5.0 |

NOTE: TG-1, TG-2 and TG-3 are the same as in Table I

Having generally described the invention, a more complete understanding can be obtained by reference to certain specific examples, which are included for purposes of illustration only and are not intended to be limiting unless otherwise specified.

EXAMPLE 1

7-[γ-(3,4,5-Trimethoxybenzoyloxy)-n-propyl]-theophylline

A 5.2 g (0.023 moles) quantity of 3,4,5-trimethoxybenzoyl chloride, 4.8 g (0.02 moles) of 7-(γ-hydroxy-n-propyl) theophylline and 4.0 g (0.04 moles) of triethylamine were dissolved in 150 ml of anhydrous benzene. The resulting solution was refluxed for 8 hours. The heated reaction mixture was filtered, and washed with a saturated saline solution, a saturated sodium bicarbonate solution and then a saturated saline solution. The washed solution was dried over anhydrous sodium sulfate and the solvent was evaporated therefrom. A 7.8 g amount of an oily substance was obtained. The material obtained was crystallized from acetone-isopropyl ether and 6.0 g of a crystalline material was obtained. Further recrystallization of the crystalline material from acetone-isopropyl ether afforded 3.6 g (41% of yield) of a white crystalline product having a melting point of 147°–149°C.

| Elemental Analysis: | $C_{20}H_{24}N_4O_7$ | | |
|---|---|---|---|
| | C | H | N |
| Calculated (%) | 55.55 | 5.59 | 12.96 |
| Found (%) | 55.45 | 5.50 | 12.67 |

EXAMPLE 2

7-[γ-(3,4,5-Trimethoxyphenoxycarbonyl)-n-propyl]theophylline

An 8.0 g (0.03 moles) amount of 7-(γ-carboxy-n-propyl)-theophylline, 5.5 g (0.03 moles) of 3,4,5-trimethoxyphenol and 0.03 moles of phosphorus oxychloride were dissolved in 200 mol of anhydrous benzene. The resulting solution was refluxed for 5 hours. After cooling, the reaction mixture was washed with a saturated sodium bicarbonate solution and a saturated saline solution. The washed solution was dried over anhydrous sodium sulfate and the solvent was evaporated therefrom. By this procedure was obtained 9.2 g of a white crystalline material. Recrystallization of the material from benzene afforded 8.5 g (66% of yield) of a white crystalline product having a metling point of 154°–156°C.

| Elemental Analysis: | $C_{20}H_{24}N_4O_7$ | | |
|---|---|---|---|
| | C | H | N |
| Calculated (%) | 55.55 | 5.59 | 12.96 |
| Found (%) | 55.44 | 5.50 | 12.78 |

EXAMPLE 3

7-[γ-(2,3,4-Trimethoxybenzoyl)-n-propyl]-theophylline

An 8.0 g (0.03 moles) amount of 7-(γ-carboxy-n-propyl)-theophylline and 3.3 g (0.02 moles) of 1,2,3-trimethoxybenzene were dissolved in 12.6 g (0.06 moles) of trifluoroacetic anhydride. The resulting solution was refluxed for 2.5 hours. After cooling, sodium bicarbonate was added to the reaction mixture in a quantity which gave a final pH of 7.0. After extracting the solution with benzene, the extract obtained was washed with a saturated sodium bicarbonate solution and a saturated saline solution. The washed solution was dried over anhydrous sodium sulfate and the solvent was evaporated therefrom. An 8.9 g amount of a reddish oily substance was obtained. This oily substance was recrystallized from isopropyl ether and further recrystallization from benzene-isopropyl ether afforded 5.1 g (41% of yield) of pale yellow needles of a compound having a melting point of 119°–120°C.

| Elemental Analysis: | $C_{20}H_{24}N_4O_6$ | | |
|---|---|---|---|
| | C | H | N |
| Calculated (%) | 57.68 | 5.81 | 13.46 |
| Found (%) | 57.54 | 5.58 | 13.41 |

Having now fully described the invention, it will be apparent to one of ordinary skill in the art that many changes and modifications can be made thereto with departing from the spirit or scope of the invention as set forth herein.

What is claimed as new and intended to be covered by Letters Patent is:

1. A theophylline compound of the formula

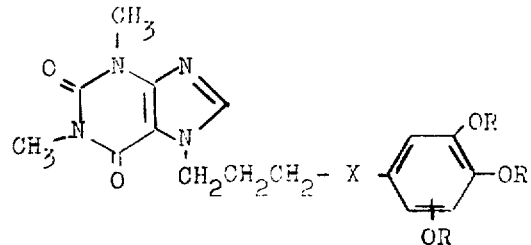

wherein R is a lower alkyl having from 1 to 5 carbon atoms and X is oxycarbonyl, carboxyl or carbonyl.

2. A theophylline compound of claim 1, wherein R is a methyl group.

3. A theophylline compound of claim 1, which is 7-[γ-(2,3,4-trimethoxybenzoyl)-n-propyl]theophylline.

4. A theophylline compound of claim 1, which is 7-[γ-(3,4,5-trimethoxyphenoxycarbonyl)-n-propyl]theophylline.

5. A theophylline compound of claim 1, which is 7-[γ-(3,4,5-trimethoxybenzoyloxy)-n-propyl]theophylline.

* * * * *